(12) United States Patent
Kanno et al.

(10) Patent No.: US 8,438,454 B2
(45) Date of Patent: May 7, 2013

(54) SEMICONDUCTOR MEMORY DEVICE AND CONTROLLING METHOD

(75) Inventors: Shinichi Kanno, Tokyo (JP); Osamu Torii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 103 days.

(21) Appl. No.: 13/218,743

(22) Filed: Aug. 26, 2011

(65) Prior Publication Data

US 2012/0246387 A1 Sep. 27, 2012

(30) Foreign Application Priority Data

Mar. 23, 2011 (JP) ................................. 2011-064831

(51) Int. Cl.
*G11C 29/00* (2006.01)
(52) U.S. Cl.
USPC ............................ 714/763; 714/758; 714/781
(58) Field of Classification Search .................. 714/758, 714/763, 781
See application file for complete search history.

(56) References Cited

U.S. PATENT DOCUMENTS

| | | | |
|---|---|---|---|
| 6,725,321 B1 * | 4/2004 | Sinclair et al. ................ | 711/103 |
| 7,916,421 B1 * | 3/2011 | Liikanen et al. ............ | 360/77.01 |
| 8,122,193 B2 * | 2/2012 | Song et al. .................... | 711/117 |
| 8,171,208 B2 * | 5/2012 | Yano et al. .................... | 711/103 |
| 8,176,237 B2 * | 5/2012 | Yano et al. .................... | 711/103 |
| 8,209,471 B2 * | 6/2012 | Yano et al. .................... | 711/103 |
| 8,225,047 B2 * | 7/2012 | Yano et al. .................... | 711/137 |

FOREIGN PATENT DOCUMENTS

| | | |
|---|---|---|
| JP | 11-110283 A | 4/1999 |
| JP | 2003-167795 A | 6/2003 |
| JP | 2004-326283 A | 11/2004 |
| JP | 2005-346887 | 12/2005 |
| WO | WO 97/32253 A1 | 9/1997 |

OTHER PUBLICATIONS

U.S. Appl. No. 13/218,812, filed Aug. 26, 2011, Fukutomi, et al.
Foreign Office Action issued Nov. 6, 2012 in Japanese Patent Application No. 2011-064831 (with English-language translation).
U.S. Appl. No. 12/889,018, filed Sep. 23, 2010, Shinichi Kanno.

* cited by examiner

*Primary Examiner* — Esaw Abraham
(74) *Attorney, Agent, or Firm* — Oblon, Spivak, McClelland, Maier & Neustadt, L.L.P.

(57) ABSTRACT

According to an embodiment, a semiconductor memory device includes a nonvolatile memory; an input/output control unit to control input/output of data to/from the nonvolatile memory; an address translation table that associates first address information specifying a logical recording position of user data stored in the nonvolatile memory with second address information indicating a physical recording position in the nonvolatile memory; a translating unit to translate the first address information to the second address information according to the table; and a generating unit to generate redundant data for checking whether there is error in the user data and the first address information used as one data piece. The input/output control unit records, as data set, the user data, the first address information, and the redundant data, which are used as one data set, in the physical recording position in the nonvolatile memory indicated by the second address information.

10 Claims, 12 Drawing Sheets

SEMICONDUCTOR MEMORY DEVICE AND CONTROLLING METHOD

CROSS-REFERENCE TO RELATED APPLICATIONS

This application is based upon and claims the benefit of priority from Japanese Patent Application No. 2011-064831, filed on Mar. 23, 2011; the entire contents of which are incorporated herein by reference.

FIELD

Embodiments described herein relate generally to a semiconductor memory device and controlling method.

BACKGROUND

In a semiconductor memory device in which a nonvolatile memory such as a NAND-type flash memory is used, addressing architecture that is specific to the memory device is controlled because such specific addressing architecture is required for wear leveling or the like. When there is a write request to a certain logical address from outside, the requested logical address is translated into a physical address indicating an actual recording position according to the addressing architecture inside the memory device. The write target data is recorded in the recording position in the flash memory indicated by the physical address.

Typically, the addressing architecture is controlled by using a table. The table for controlling the addressing architecture will be hereinafter referred to as an address translation table. The address translation table is stored in a volatile memory such as a static random access memory (SRAM) and a dynamic random access memory (DRAM) provided in the semiconductor memory device, for example.

In recent years, however, errors such as soft errors occur in a SRAM, a DRAM or the like more and more frequently with miniaturization of semiconductor manufacturing processes. As a result, an error may occur in the address translation table itself. The embodiments therefore disclose a semiconductor memory device capable of correcting an error in an address translation table itself.

DETAILED DESCRIPTION

According to an embodiment, a semiconductor memory device includes a nonvolatile memory; an interface unit configured to receive, from an outside, first address information that specifies a logical recording position of user data stored in the nonvolatile memory when the user data is to be read out; an input/output control unit configured to control input and output of data to/from the nonvolatile memory; an address translation table that associates the first address information with second address information indicating a physical recording position in the nonvolatile memory; a translating unit configured to translate the first address information to the second address information according to the address translation table; and a check code generating unit configured to generate redundant data for checking whether or not there is any error in the use data and the first address information used as one data piece. The input/output control unit records the user data, the first address information and the redundant data, which are used as one data set, in the physical recording position in the nonvolatile memory indicated by the second address information.

Various embodiments will be described hereinafter with reference to the accompanying drawings.

First Embodiment

Figure 1:
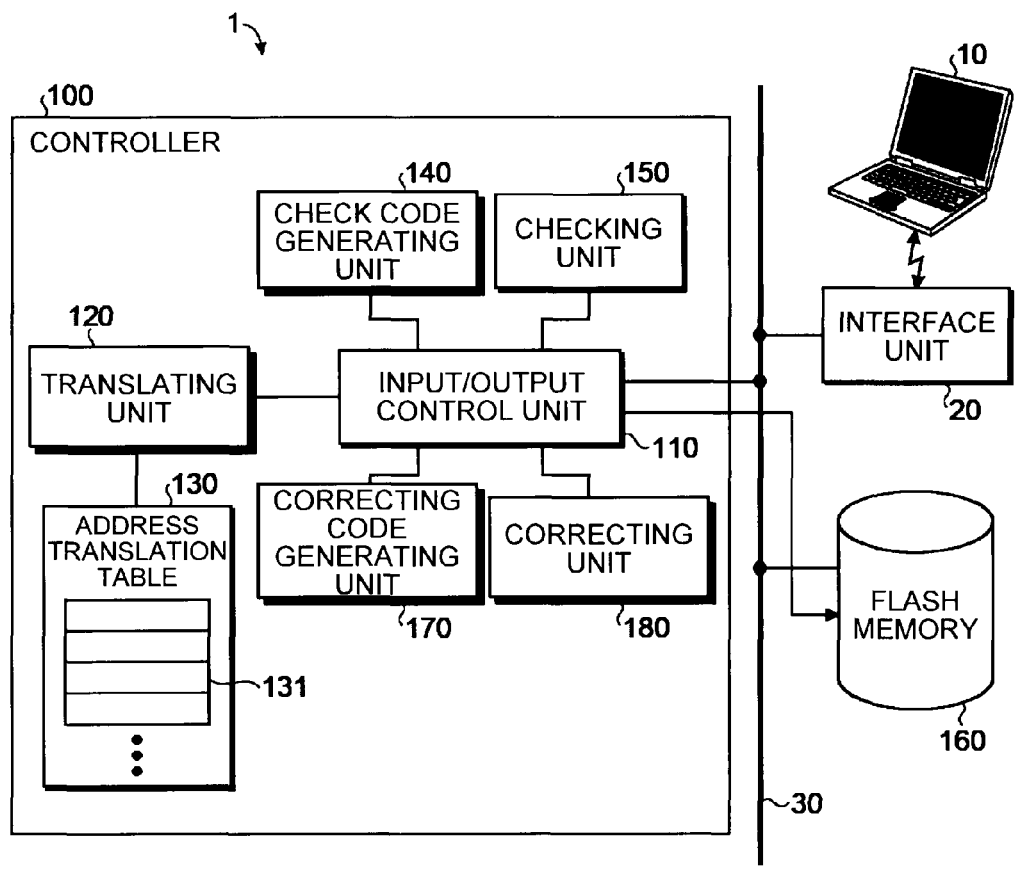
FIG. 1 is a schematic diagram of a semiconductor memory device according to a first embodiment.

A semiconductor memory device according to a first embodiment will be described below in detail with reference to the drawings. As illustrated in FIG. 1, a semiconductor memory device 1 according to the first embodiment includes a controller 100, an interface unit 20, and a NAND-type flash memory (hereinafter simply referred to as a flash memory) 160. A host computer (hereinafter simply referred to as a host) 10 writes and reads data to/from the semiconductor memory device 1 based on virtual memory space. The flash memory 160 stores data in real memory space. The controller 100 controls addressing architecture indicating association between the virtual memory space and the real memory space.

Write requests and read requests output by the host 10 are received by the interface unit 20. A write request includes user data M to be written and a logical address L specifying a write position of the user data M in the virtual memory space. A read request includes a logical address L indicating a position in the virtual memory space in which user data M to be read is stored. The received write requests and read requests are input to the controller 100 via an internal bus 30.

The controller 100 controls writing of user data to the flash memory 160, reading of user data from the flash memory 160 and the like in response to data write requests and data read requests from the host 10. The controller 100 includes an input/output control unit 110, a translating unit 120, a dynamic random access memory (DRAM) 130, a check code generating unit 140, a checking unit 150, a correcting code generating unit 170, and a correcting unit 180. The DRAM 130 may be replaced with another volatile memory such as a static RAM (SRAM).

The check code generating unit 140 receives user data M and a logical address L (hereinafter referred to as check target data ML) from the input/output control unit 110, for example, and generates an error check code A1 for the user data M and the logical address L. The check code generating unit 140 then outputs the generated error check code A1 to the input/output control unit 110, for example.

The checking unit 150 receives check target data ML and an error check code A1 thereof from the input/output control unit 110, for example, and checks whether or not there is any error in the check target data ML by using the error check code A1. The checking unit 150 then outputs the check result to the input/output control unit 110, for example.

The correcting code generating unit 170 receives user data M, a logical address L and an error check code A1 (hereinafter referred to as correction target data MLA1) from the input/output control unit 110, for example, and generates an error correcting code A2 for the user data M, the logical address L and the error check code A1, namely, the correction target data MLA1. The correcting code generating unit 170 then outputs the generated error correcting code A2 to the input/output control unit 110, for example.

The correcting unit 180 receives correction target data MLA1 and an error correcting code A2 therefor from the input/output control unit 110, for example, and corrects an error in the correction target data MLA1 by using the error correcting code A2. The correcting unit 180 then outputs the correction result to the input/output control unit 110, for example.

The translating unit 120 translates a logical address L contained in a request from the host 10 received via the input/output control unit 110 into a physical address P in real memory space. An address translation table 131 stored in the DRAM 130 is used for the address translation. Specifically, associations between logical addresses L in the virtual memory space and physical addresses P in the real memory space are registered in the address translation table 131. The translating unit 120 refers to the address translation table 131 using the logical address L to obtain the physical address P associated with the logical address L. The translating unit 120 then outputs the obtained physical address P to the input/output control unit 110.

When the flash memory 160 is instructed to write data by the input/output control unit 110, the flash memory 160 receives a data set 161 to be written (see FIG. 3, for example) and a physical address P indicating a write position in the real memory space from the input/output control unit 110. Subsequently, the flash memory 160 writes the received data set 161 to the recording position at the physical address P.

When the flash memory 160 is instructed to read data by the input/output control unit 110, the flash memory 160 receives a physical address P indicating the position in the real memory space in which the data to be read are stored from the input/output control unit 110. Subsequently, the flash memory 160 reads the data set 161 stored in the recording position at the received physical address P, and outputs the read data set 161 to the input/output control unit 110.

When the input/output control unit 110 receives a write request or a read request from the host 10, the input/output control unit 110 controls input/output of data to/from each unit. The input/output control unit 110 also controls writing and reading of data to/from the flash memory 160. Write control and read control according to the first embodiment will be described here with reference to the drawings.

Figure 2:
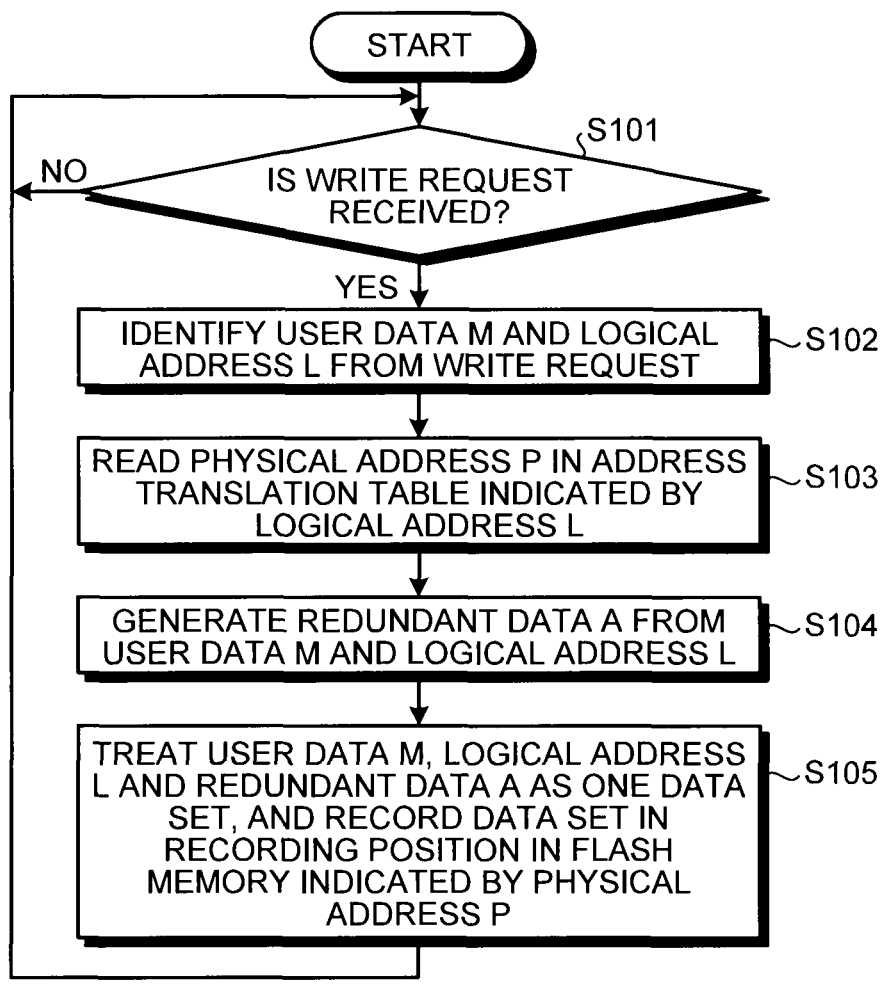
FIG. 2 is a flowchart illustrating a flow of write control according to the first embodiment.
Figure 3:
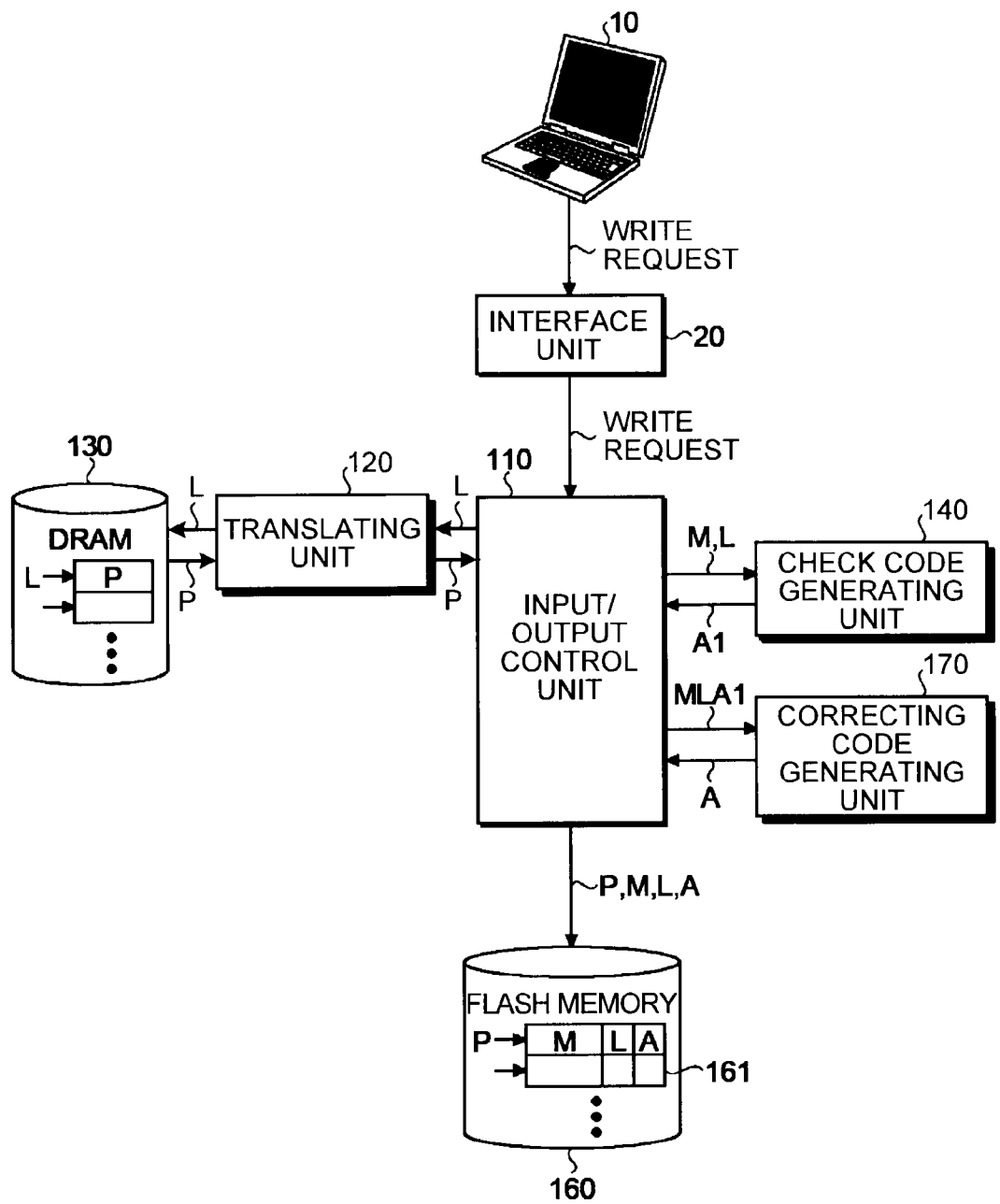
FIG. 3 is a schematized diagram of the flowchart illustrated in FIG. 2.

First, the write control will be described. FIG. 2 is a flowchart illustrating a flow of the write control according to the first embodiment. FIG. 3 is a schematized diagram of the flowchart illustrated in FIG. 2.

As illustrated in FIGS. 2 and 3, the input/output control unit 110 waits for a write request from the host 10 (No in step S101). Upon receiving a write request from the host 10 via the interface unit 20 (Yes in step S101), the input/output control unit 110 identifies user data M and a logical address L contained in the write request (step S102). Subsequently, the input/output control unit 110 inputs the identified logical address L to the translating unit 120. The translating unit 120 refers to the address translation table 131 in the DRAM 130 and reads a physical address P associated with the input logical address L (step S103). The read physical address P is input to the input/output control unit 110.

The input/output control unit 110 then inputs the user data M and the logical address L identified in step S102 to the check code generating unit 140. The check code generating unit 140 generates an error check code A1 for error check of the input user data M and logical address L as one data piece.

The input/output control unit 110 then inputs the user data M and the logical address L, which are identified in step S102, and the error check code A1 to the correcting code generating unit 170. The correcting code generating unit 170 generates an error correcting code A2 for error correction of the input user data M and logical address L and the error check code A1 as one data piece (correction target data MLA1). The correcting code generating unit 170 further generates redundant data A containing the error check code A1 and the error correcting code A2 together (step S104). The generated redundant data A is input to the input/output control unit 110.

Upon obtaining the physical address P and the redundant data A as described above, the input/output control unit 110 records the user data M, the logical address L and the redundant data A as one data set 161 in the recording position in the flash memory 160 indicated by the physical address P as illustrated in FIG. 3 (step S105). Then, the input/output control unit 110 returns to step S101 where it waits for the next write request. This write operation is terminated as a result of end of external interrupt, for example.

Figure 4:
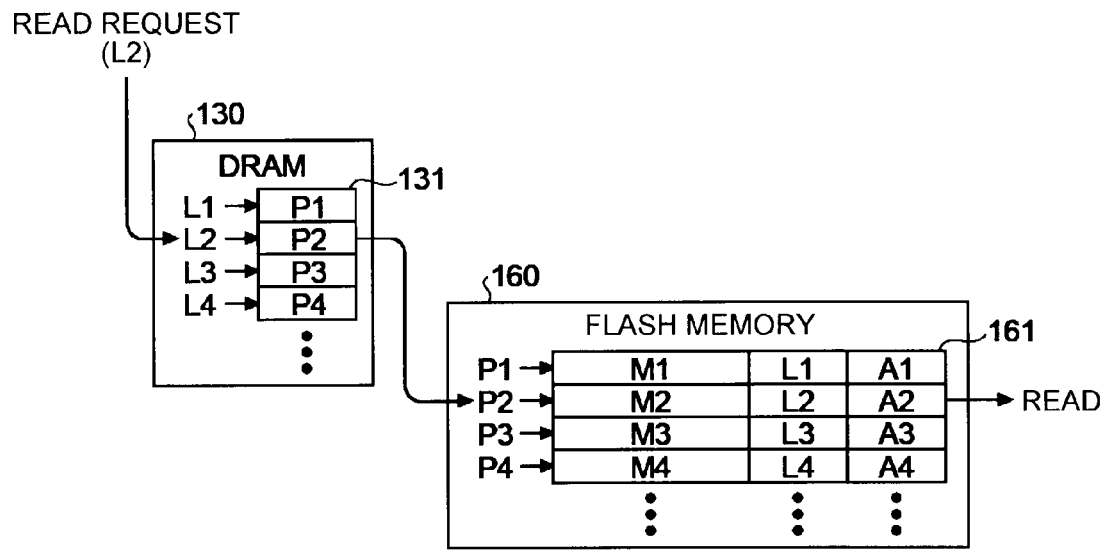
FIG. 4 is a diagram illustrating a read operation in a normal state in the first embodiment.
Figure 5:
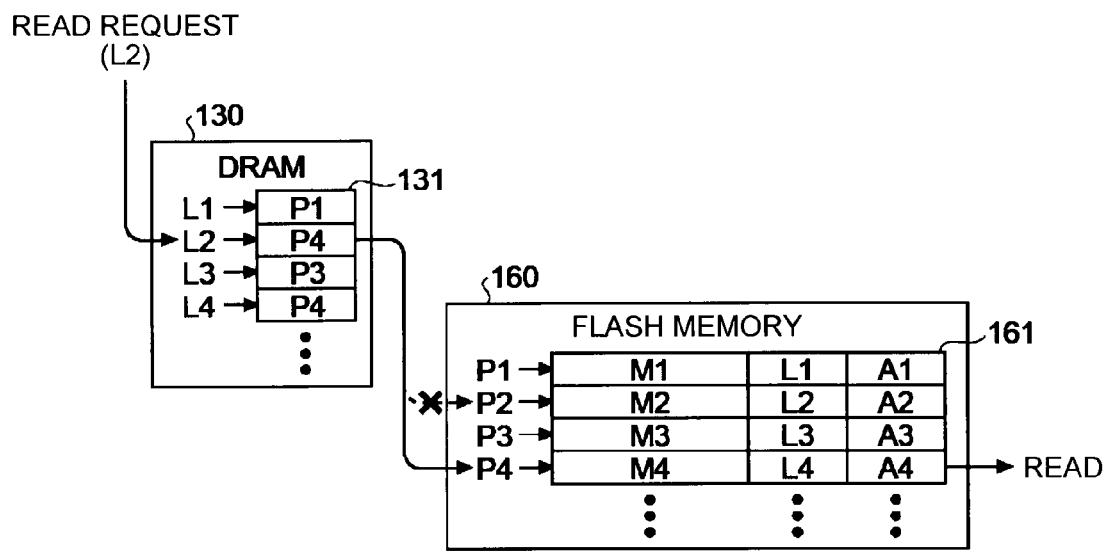
FIG. 5 is a diagram illustrating a read operation in an error state in the first embodiment.

Next, possible problems that may occur during read operations in recent years will be described before description of read control. In recent years, errors such as soft errors occur in a DRAM or a SRAM more and more frequently with miniaturization of semiconductor manufacturing processes. Thus, an error may occur in the address translation table itself. As illustrated in FIG. 4, for example, if a logical address L2 is correctly associated with a physical address P2 in the address translation table 131, data are read from the recording position in the flash memory 160 indicated by the physical address P2 in response to a read request specifying the logical address L2. On the other hand, as illustrated in FIG. 5, for example, if the logical address L2 is incorrectly associated with a physical address P4 because of an error occurring in the address translation table 131, data are read from the recording position in the flash memory 160 indicated by the physical address P4 in response to a read request specifying the logical address L2.

It may be considered to use an error detecting code (EDC) such as an error correcting code (ECC) and a cyclic redundancy code (CRC) for check and correction of an error occurring in an address translation table. However, the address translation table is accessed in small units. Accordingly, a 6-bit redundancy code is required for 32-bit data, for example, so as to achieve sufficient check capability and correction capability. On the other hand, a semiconductor memory device such as a solid state drive (SSD) in which a NAND-type flash memory is used can have increased performance by reducing the size of a unit storage area controlled by an address translation table. It is assumed here that one physical address is assigned to one unit storage area. If the size of the unit storage area is reduced, the number of addresses to be controlled also increases. Therefore, if the redundancy codes are added to all the addresses, the amount of data to be controlled is significantly increased. For such reasons, it is difficult to reduce the size of a unit storage area to be controlled by an address translation table in some cases.

Figure 6:
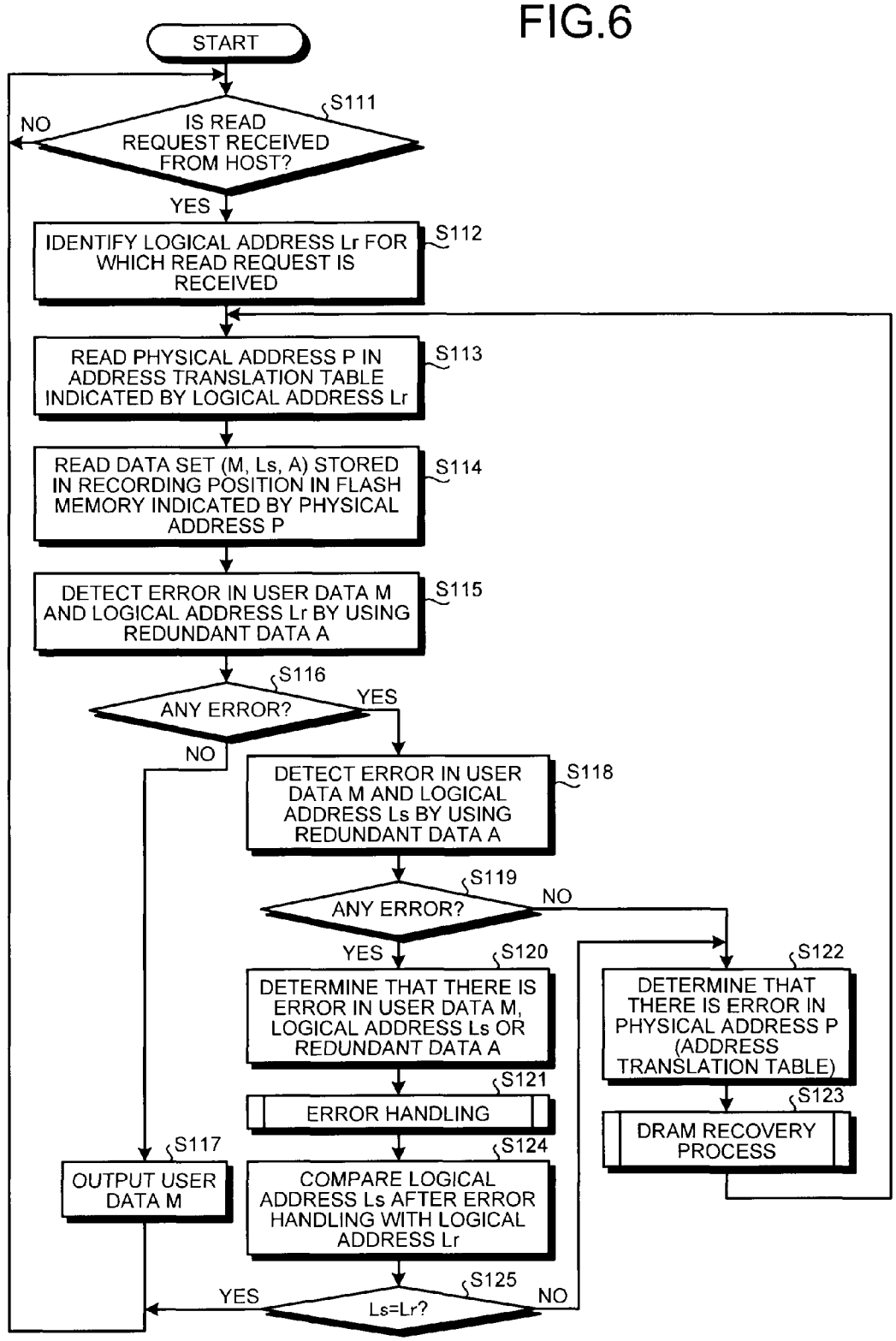
FIG. 6 is a flowchart illustrating a flow of read control according to the first embodiment.
Figure 7:
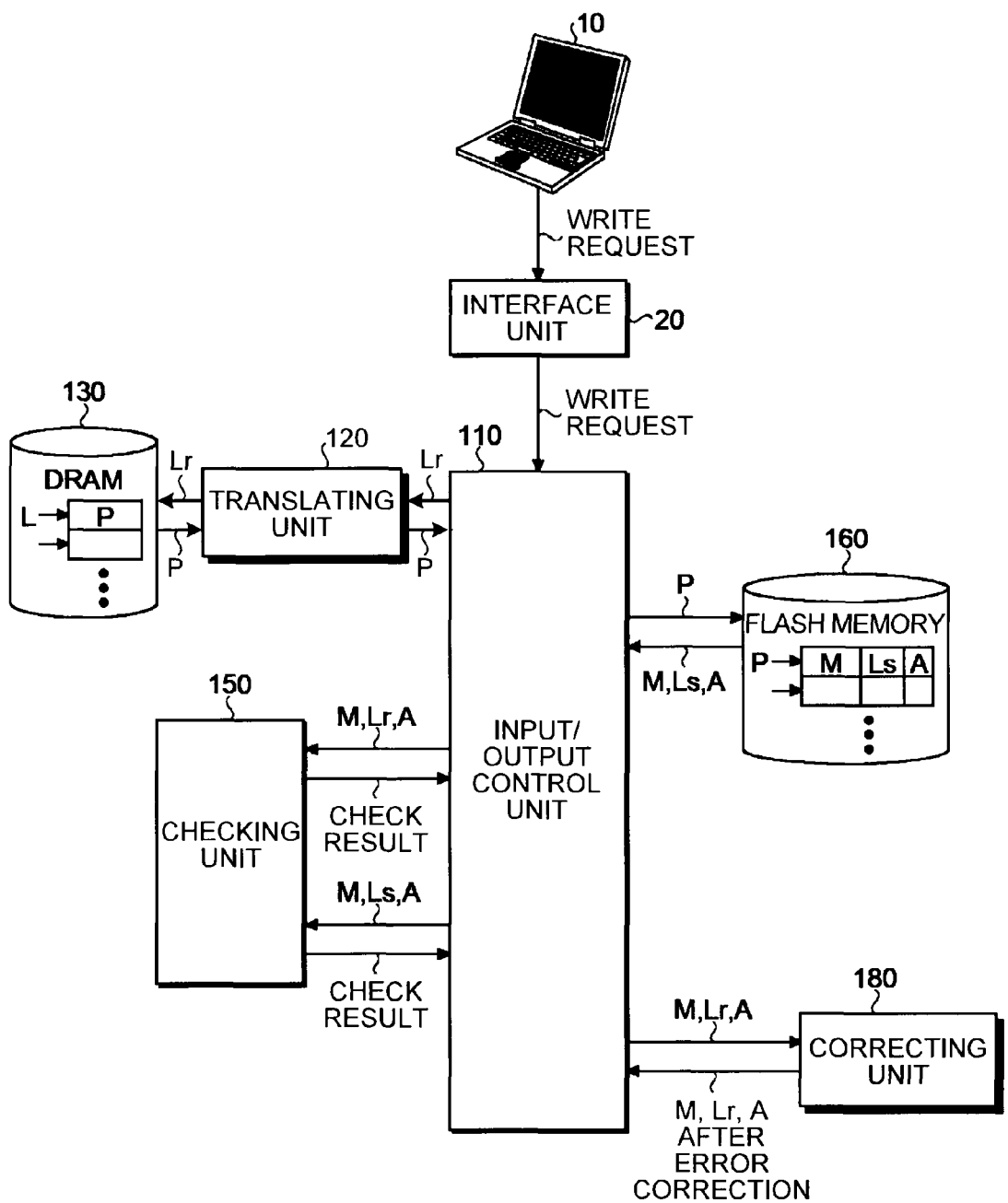
FIG. 7 is a schematized diagram of the flowchart illustrated in FIG. 6.

Therefore, the following read control is performed in the first embodiment. FIG. 6 is a flowchart illustrating a flow of the read control according to the first embodiment. FIG. 7 is a schematized diagram of the flowchart illustrated in FIG. 6.

As illustrated in FIGS. 6 and 7, the input/output control unit 110 waits for a read request from the host 10 (No in step S111). Upon receiving a read request from the host 10 via the interface unit 20 (Yes in step S111), the input/output control unit 110 identifies a logical address Lr contained in the read request (step S112). Subsequently, the input/output control unit 110 inputs the identified logical address Lr to the translating unit 120. The translating unit 120 refers to the address translation table 131 in the DRAM 130 and reads a physical address P associated with the input logical address Lr (step S113). The read physical address P is input to the input/output control unit 110.

Next, the input/output control unit 110 reads a data set 161 (user data M, logical address Ls and redundant data A) stored in the recording position in the flash memory 160 indicated by the physical address P (step S114). Subsequently, the input/output control unit 110 inputs the read user data M and redundant data A and the logical address Lr contained in the read request to the checking unit 150. The checking unit 150 checks whether or not there is any error in the user data M and the logical address Lr as one data piece by using the redundant data A (step S115). The check result is input to the input/output control unit 110.

If no error is detected as a result of step S115 (No in step S116), the input/output control unit 110 outputs the read user data M to the host 10 via the interface unit 20 (step S117). Then, the controller 100 returns to step S111. The read operation is terminated as a result of end of external interrupt, for example.

On the other hand, if an error is detected as a result of step S115 (Yes in step S116), the input/output control unit 110 inputs the read data set 161 (user data M, logical address Ls and redundant data A) to the checking unit 150. The checking unit 150 checks whether or not there is any error in the user data M and the logical address Ls as one data piece by using the redundant data A (step S118). The check result is input to the input/output control unit 110.

If an error is detected as a result of step S118 (Yes in step S119), the controller 100 determines that there is an error in the read user data M, logical address Ls or redundant data A (step S120), and performs predetermined error handling (step S121). The predetermined error handling may be correction of data in the flash memory 160 by using the error correcting code A2, for example.

Then, in step S124, the controller 100 compares the logical address Ls after the error handling with the logical address Lr. If the logical address Ls is different from the logical address Lr (No in step S125), the controller 100 proceeds to step S122. On the other hand, if the logical address Ls is identical to the logical address Lr (Yes in step S125), the controller 100 returns to step S111.

If no error is detected as a result of step S118 (No in step S119), the controller 100 determines that the physical address P obtained from the address translation table 131, that is, the address translation table 131 itself has an error (S122), and performs a process to recover the DRAM 130 in which the address translation table 131 is stored (step S123). The controller 100 then returns to step S113 and performs subsequent operations based on the recovered address translation table 131.

In the DRAM recovery process, the logical address Ls stored in the flash memory 160 is read out together with the physical address P of the recording position in which the logical address Ls is stored, for example. Then, the value of the physical address P associated with the read logical address Ls is updated in the address translation table 131. As a result, the address translation table 131 is recovered. Alternatively, a copy of the address translation table 131 may be stored in the flash memory 160, for example. In this case, it is possible to easily recover the DRAM by referring to the copy of the address translation table, which allows the time required for the recovery process to be reduced. This method, however, is only one example. Obviously, the recovery process may be modified in any manner as long as the DRAM can be recovered thereby.

In the first embodiment, as described above, the user data M and the logical address L are used as one data piece to generate the redundant data A, the redundant data A together with the user data M and the logical address L are used as one data set 161, and the data set 161 is stored in the flash memory 160. It is thus possible to identify an error even if such error occurs in the address translation table 131 itself. As a result, it is possible to correct even an error in the address translation table 131 itself.

Second Embodiment

Next, a semiconductor memory device according to a second embodiment will be described in detail with reference to the drawings. In the following description, components similar to those in the first embodiment will be designated by the same reference numerals and redundant description thereof will not be repeated. In the second embodiment, an address translation table can be subjected to error correction directly. Accordingly, an error in the address translation table itself can be corrected with a simple configuration. Moreover, a process to be performed when an error occurs in the address translation table itself can be performed at high speed.

Figure 8:
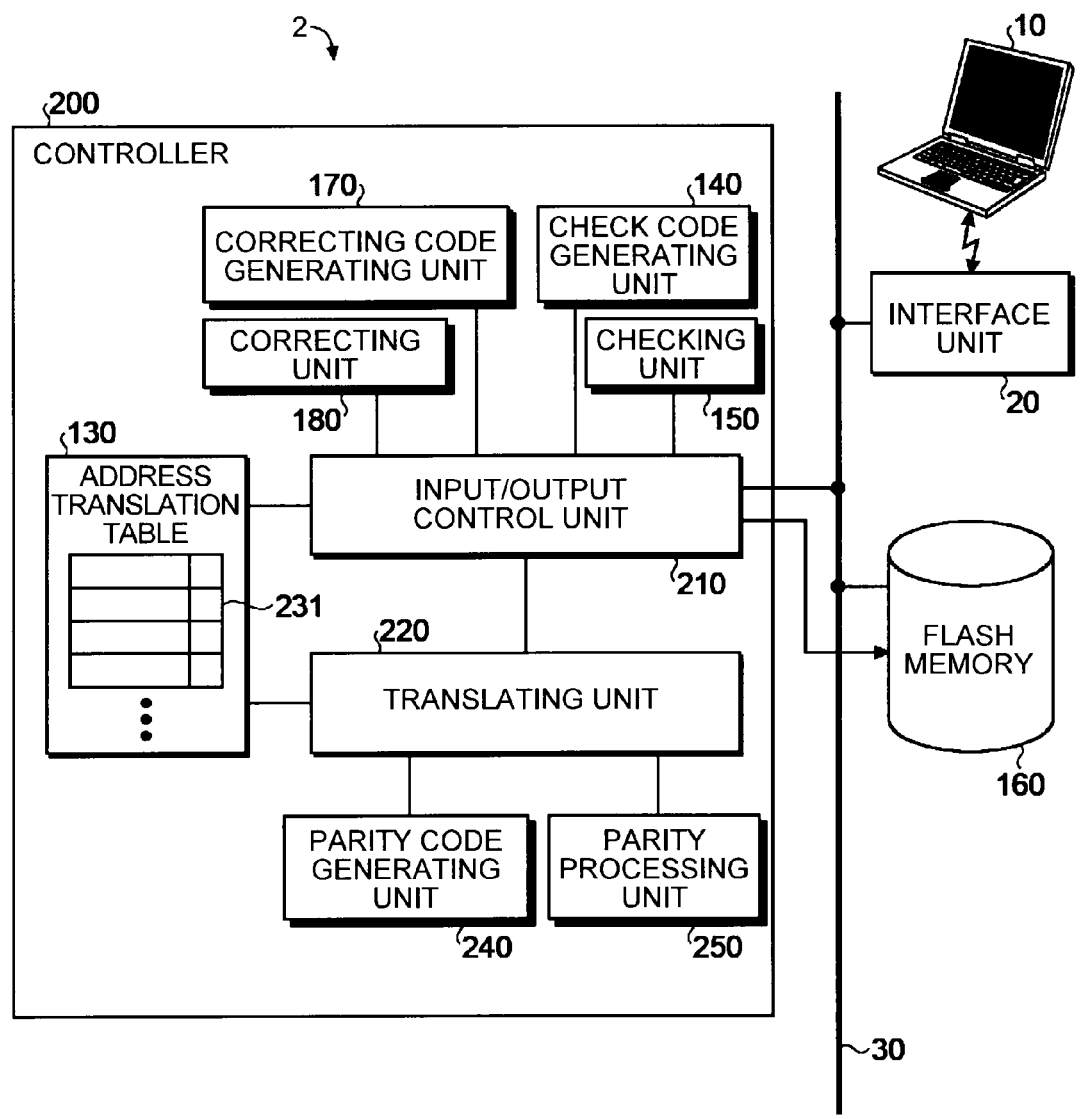
FIG. 8 is a schematic diagram of a semiconductor memory device according to a second embodiment.

As illustrated in FIG. 8, a semiconductor memory device 2 according to the second embodiment has a configuration similar to that of the semiconductor memory device 1 illustrated in FIG. 1 but the controller 100 therein is replaced with a controller 200.

The controller 200 includes an input/output control unit 210, a translating unit 220, an address translation table 231 stored in the DRAM 130, the check code generating unit 140, the checking unit 150, the correcting code generating unit 170 and the correcting unit 180. The controller 200 also includes a parity code generating unit 240 and a parity processing unit 250 as components for correcting an error in the address translation table 231.

Figure 9:
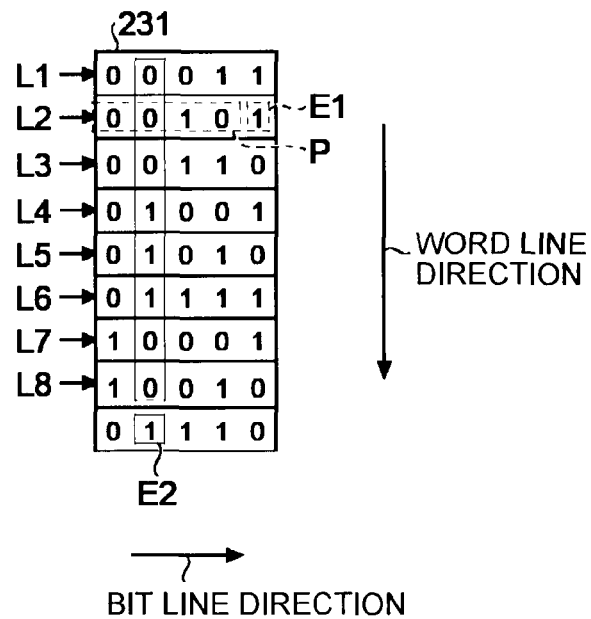
FIG. 9 is a diagram illustrating one example of an address translation table according to the second embodiment.

An example of the address translation table 231 according to the second embodiment is illustrated in FIG. 9. As illustrated in FIG. 9, the address translation table 231 according to this embodiment contains horizontal parity codes E1 and vertical parity codes E2 for correcting an error in the address translation table 231. The horizontal parity codes E1 are used for checking an error occurring in a bit string in a bit line direction in the DRAM 130, for example. The vertical parity codes E2 are used for checking an error occurring in a bit string in a word line direction in the DRAM 130, for example.

The address translation table 231 has a data structure in which physical addresses P are arranged in the word line direction, for example. Accordingly, the horizontal parity codes E1 are used for checking an error occurring for each physical address P. Although FIG. 9 illustrates one-bit horizontal parity codes E1 and one-bit vertical parity codes E2 as an example, the codes are not limited thereto.

The translating unit 220 has functions similar to those of the translating unit 120 in the first embodiment. In addition, for adding or updating associations between logical addresses L and physical addresses P, for example, the translating unit 220 reads out values in the DRAM 130 for each word line or for each bit line and inputs the read bit string to the parity code generating unit 240. The parity code generating unit 240 generates a horizontal parity code E1 or a vertical parity code E2 for the input bit string and returns the generated parity code to the translating unit 220. The horizontal parity codes E1 and the vertical parity code E2 generated in this manner are provided to the address translation table 231 in the DRAM 130 by the translating unit 220.

The translating unit 220 also reads out the bit values in the DRAM 130 for each word line or for each bit line, and inputs the read bit string to the parity processing unit 250. The parity processing unit 250 identifies a horizontal parity code E1 or a vertical parity code E2 in the input bit string, and corrects an error in the bit string by using the horizontal parity code E1 or the vertical parity code E2. The bit string thus corrected is stored in the address translation table 231 in the DRAM 130 by the translating unit 220.

Next, operations according to the second embodiment will be described with reference to the drawings. Write operation according to the second embodiment is similar to that according to the first embodiment. Read operation according to the second embodiment includes operations illustrated in FIG. 10 between step S112 and step S113 in addition to the read operation illustrated in FIG. 6.

Figure 10:
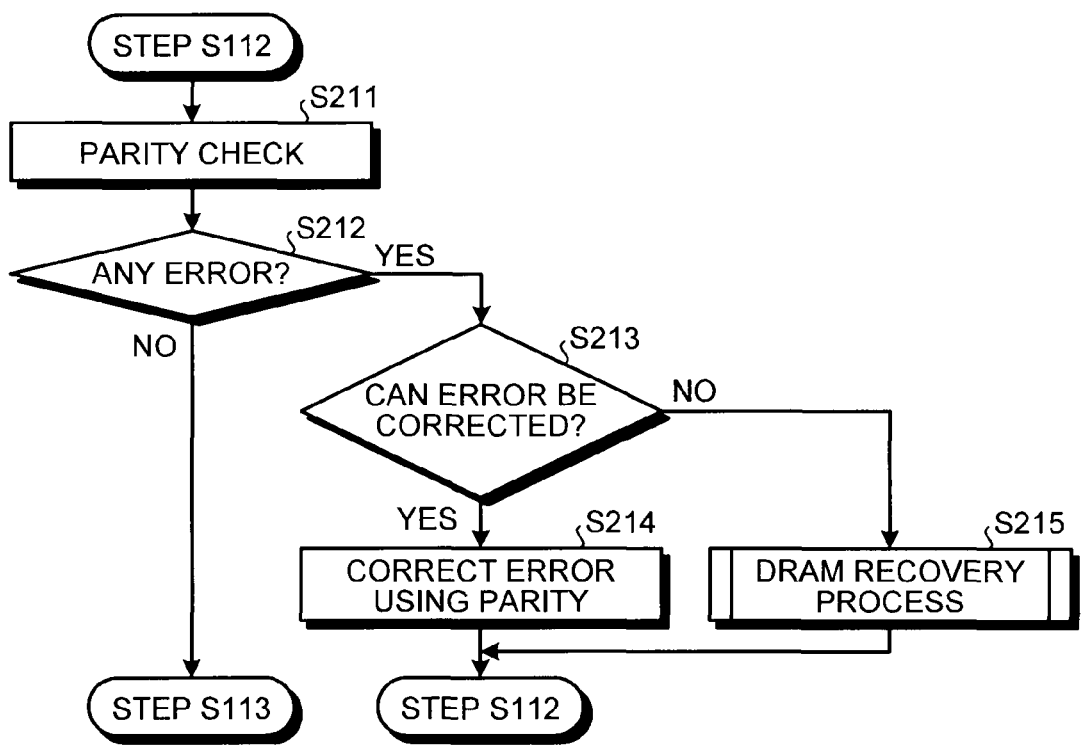
FIG. 10 is a flowchart illustrating a flow of part of read control according to the second embodiment.

As in steps S111 to S112 in FIG. 6, upon identifying a logical address Lr contained in a read request from the host 10 (step S112), the input/output control unit 210 inputs the identified logical address Lr to the translating unit 220. As illustrated in FIG. 10, the translating unit 220 performs a parity check on a physical address P associated with the input logical address Lr (step S211). Specifically, the translating unit 220 reads out the physical address P associated with the input logical address Lr, and checks the read physical address P by using the horizontal parity code E1, for example. The check result is input to the translating unit 220.

If no error is found as a result of the parity check in step S211 (No in step S212), the translating unit 220 proceeds to step S113 in FIG. 6 without any change.

On the other hand, if an error is found as a result of the parity check in step S211 (Yes in step S212), the translating unit 220 determines whether or not the error can be corrected (step S213). If the error can be corrected (Yes in step S213), the translating unit 220 corrects the error in the bit string in the DRAM 130 by using the horizontal parity code E1 and the vertical parity code E2 (step S214). Specifically, a bit value at a position where errors are detected in both the horizontal parity code E1 and the vertical parity code E2 is inverted in an array of bits in a form of a matrix in the DRAM 130, for example. As a result, the physical address P registered in the address translation table 231 is recovered. Whether or not an error can be corrected can be determined by determining whether or not the number of error bits is 1, for example. After recovery of the DRAM 130, the translating unit 220 returns to step S112 in FIG. 6, and obtains again a physical address P associated with the logical address Lr from the recovered address translation table 231.

On the other hand, if it is determined that the error cannot be corrected as a result of step S213 (No in step S213), the controller 200 performs a DRAM recovery process similar to that in step S123 of FIG. 6 (step S215), and then returns to step S112 of FIG. 6 where the controller 200 obtains again a physical address P associated with the logical address Lr from the recovered address translation table 231.

Figure 11:
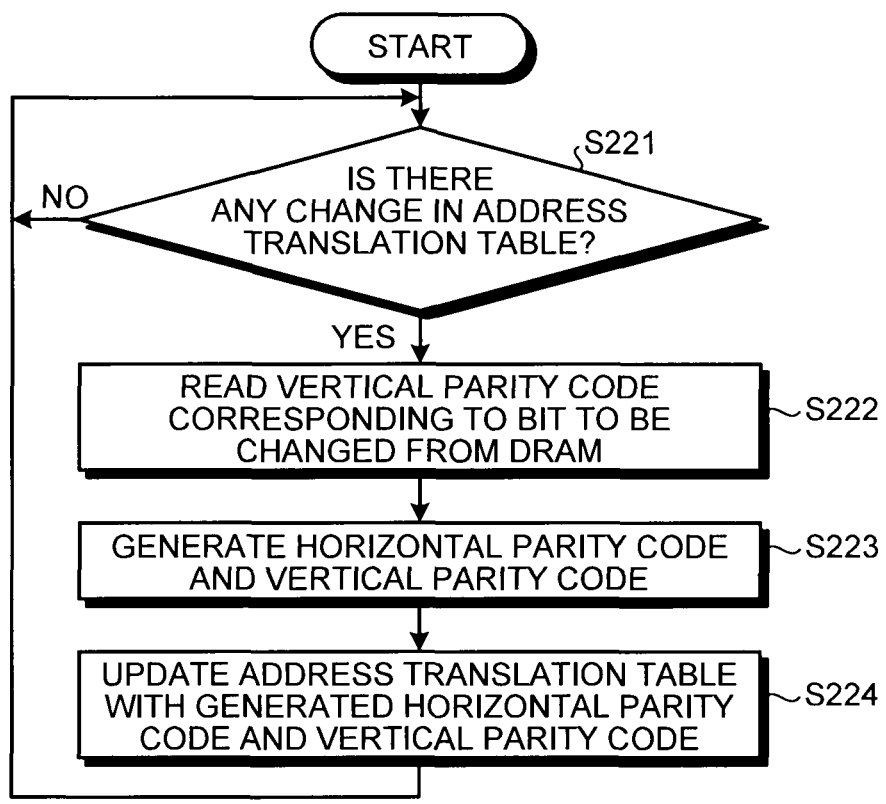
FIG. 11 is a flowchart illustrating a parity generating operation according to the second embodiment.

Furthermore, in the second embodiment, for adding or updating associations between logical addresses L and physical addresses P, for example, a parity generation operation of generating horizontal parity codes E1 and vertical parity codes E2 to be provided to the address translation table 231 is performed. FIG. 11 is a flowchart illustrating a parity generating operation according to the second embodiment.

As illustrated in FIG. 11, the translating unit 220 determines whether or not there is any change in the address translation table 231 in the DRAM 130 (step S221). If there is no change in the address translation table 231 (No in step S221), the translating unit 220 does not proceed to step S222. On the other hand, if there is a change in the address translation table 231 (Yes in step S221), the translating unit 220 reads a vertical parity code E2 associated with the bit to be changed from the DRAM 130 (step S222), and inputs the read vertical parity code E2 and the physical address P to be changed to the parity code generating unit 240. The parity code generating unit 240 generates a horizontal parity code E1 for the input physical address P and a vertical parity code E2 on the corresponding vertical parity column (step S223). The generated horizontal parity code E1 and vertical parity code E2 are input to the translating unit 220. The translating unit 220 updates the address translation table 231 in the DRAM 130 with the input horizontal parity code E1 and vertical parity code E2 (step S224). Then, the translating unit 220 returns to step S221. This parity generating operation is terminated as a result of end of external interrupt, for example.

In the second embodiment, as described above, a configuration to correct an error in the address translation table 231 (horizontal parity codes E1, vertical parity codes E2, parity code generating unit 240 and parity processing unit 250) are provided in addition to the configuration similar to that of the first embodiment. As a result, it is possible to quickly correct an error occurring in the address translation table 231 itself. The other components and operations are similar to those in the first embodiment, and redundant description thereof will not be repeated here.

In the second embodiment, parity codes are used as redundant data for checking or correcting an error in the address translation table 231 itself. However, the redundant data are not limited thereto and various redundant data can be used. If a relatively large error check (correction) capability like the error check (correction) function according to the first embodiment is provided as in the second embodiment, a relatively minor error check (correction) capability such as parity codes may be preferably employed in the configuration for checking (correcting) an error in the address translation table 231 itself. With such a configuration, it is possible to reduce the load on write and read operations.

Third Embodiment

Next, a semiconductor memory device according to a third embodiment will be described in detail with reference to the drawings. In the following description, components similar to those in the first or second embodiment will be designated by the same reference numerals and redundant description thereof will not be repeated. In the third embodiment, part or the whole of an address translation table stored in a DRAM of a controller is stored in a flash memory. Accordingly, the configuration for correcting an error in the address translation table itself can be realized as a simple configuration. Moreover, a process to be performed when an error occurs in the address translation table can be performed at high speed. In the following description, the second embodiment will be referred to. However, the third embodiment is not limited thereto and may be applied to the first embodiment.

Figure 12:
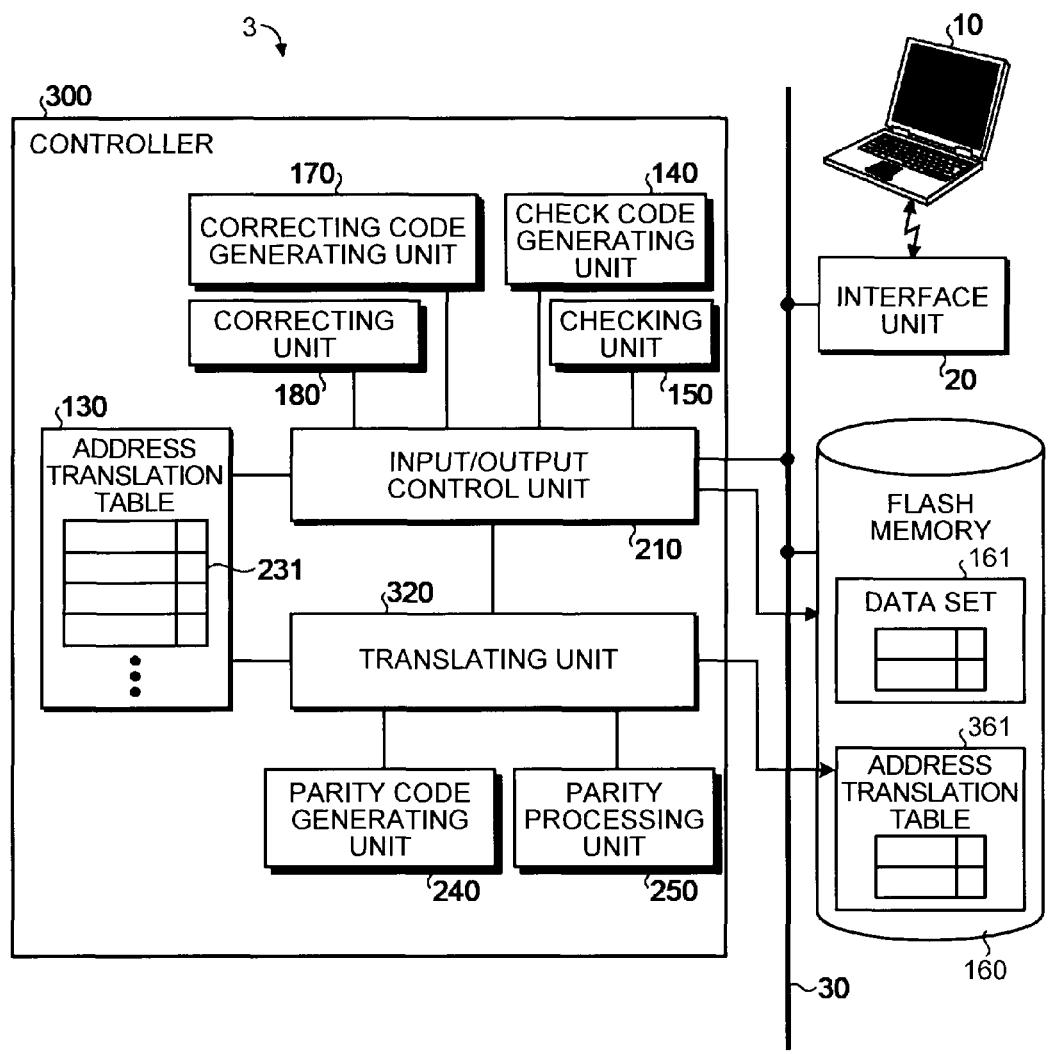
FIG. 12 is a schematic diagram of a semiconductor memory device according to a third embodiment.

As illustrated in FIG. 12, a semiconductor memory device 3 according to the third embodiment has a configuration similar to that of the semiconductor memory device 2 illustrated in FIG. 8 but the controller 200 therein is replaced with a controller 300. The controller 300 has a configuration similar to that of the controller 200 illustrated in FIG. 8. However, the translating unit 220 is replaced with a translating unit 320. Moreover, in the third embodiment, an address translation table 361 that is a copy of part or the whole of the address translation table 231 stored in the DRAM 130 is stored in the flash memory 160.

The address translation table 231 in the DRAM 130 is copied in the flash memory 160 periodically or as necessary. An operation for copying the address translation table 231 to the flash memory 160 will be described here in detail with reference to the drawings.

Figure 13:
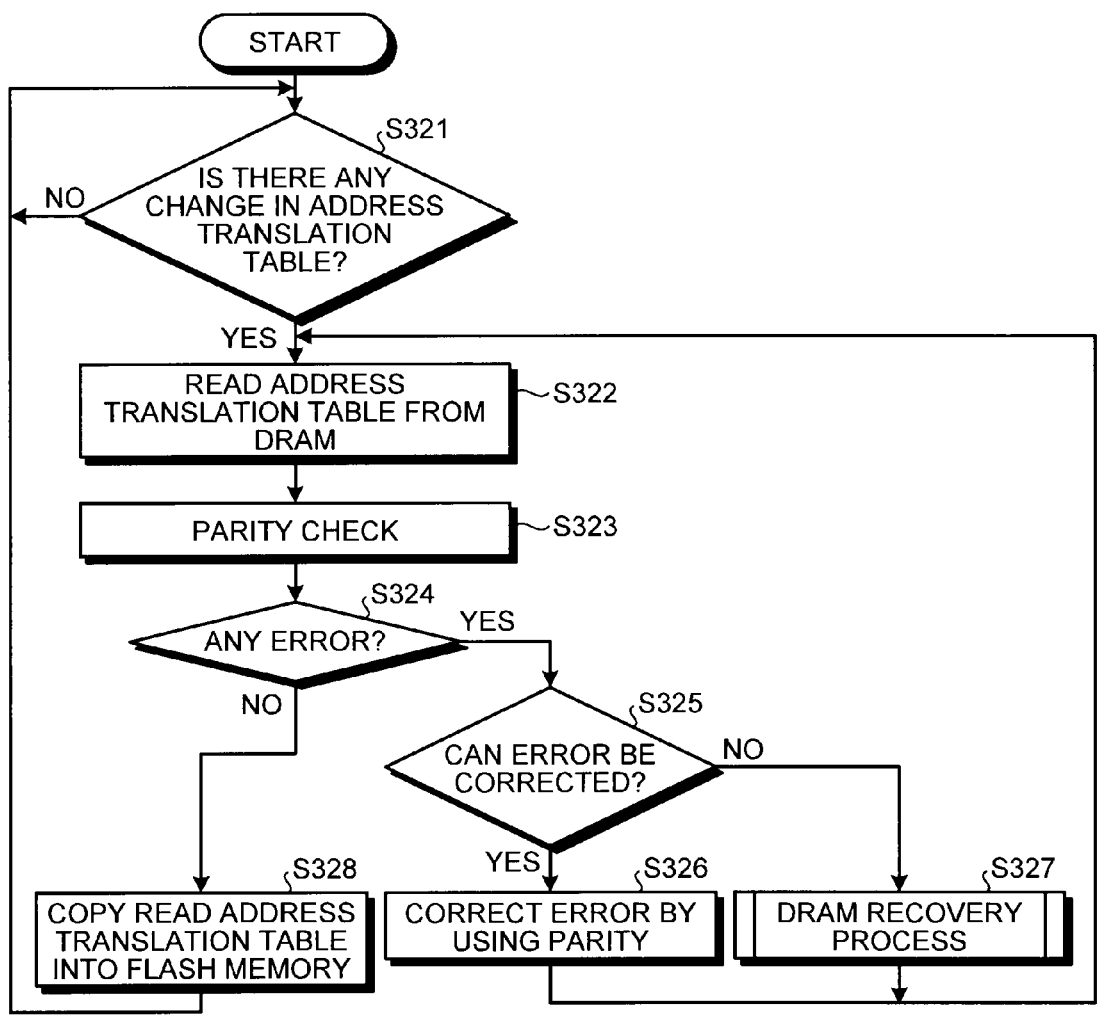
FIG. 13 is a flowchart illustrating a copy operation according to the third embodiment.

FIG. 13 is a flowchart illustrating a flow of the copy operation according to the third embodiment. As illustrated in FIG. 13, the translating unit 320 always or periodically monitors a change in the address translation table 231 in the DRAM 130 (No in step S321). If there is a change in the address translation table 231 (Yes in step S321), the translating unit 320 reads the address translation table 231 from the DRAM 130 (step S322). Subsequently, the translating unit 320 performs a parity check on the read address translation table 361 (step S323). Specifically, the translating unit 320 reads a bit string in the bit line direction and a bit line in the word line direction in an array of bits in a form of a matrix constituting the address translation table 231, and checks the read bit strings by using an horizontal parity code E1 and a vertical parity code E2, for example. The check result is input to the translating unit 320.

If no error is found as a result of the parity check in step S323 (No in step S324), the translating unit 320 copies the read address translation table 231 to a predetermined storage area in the flash memory 160 (step S328).

On the other hand, if an error is found as a result of the parity check in step S323 (Yes in step S324), the translating unit 320 determines whether or not the error can be corrected (step S325). If the error can be corrected (Yes in step S325), the translating unit 320 corrects the error in the bit string by using the horizontal parity code E1 or the vertical parity code E2 (step S326). Specifically, a bit value at a position where errors are detected in both the horizontal parity code E1 and the vertical parity code E2 is inverted in an array of bits in a form of a matrix in the DRAM 130, for example. As a result, the physical address P registered in the address translation table 231 is recovered. After recovery of the DRAM 130, the translating unit 320 proceeds to step S328.

On the other hand, if it is determined that the error cannot be corrected as a result of step S325 (No in step S325), the controller 300 performs a DRAM recovery process similar to that in step S123 of FIG. 6 (step S327), and then proceeds to step S328. The controller 300 then performs subsequent operations. This copy operation is terminated as a result of end of external interrupt, for example.

Next, operations according to the third embodiment will be described with reference to the drawings. Write operation according to the third embodiment is similar to that according to the first embodiment. Read operation according to the third embodiment is similar to the read operation illustrated in FIG. 6 but the DRAM recovery process in step S123 is replaced with the operations as illustrated in FIG. 14.

Figure 14:
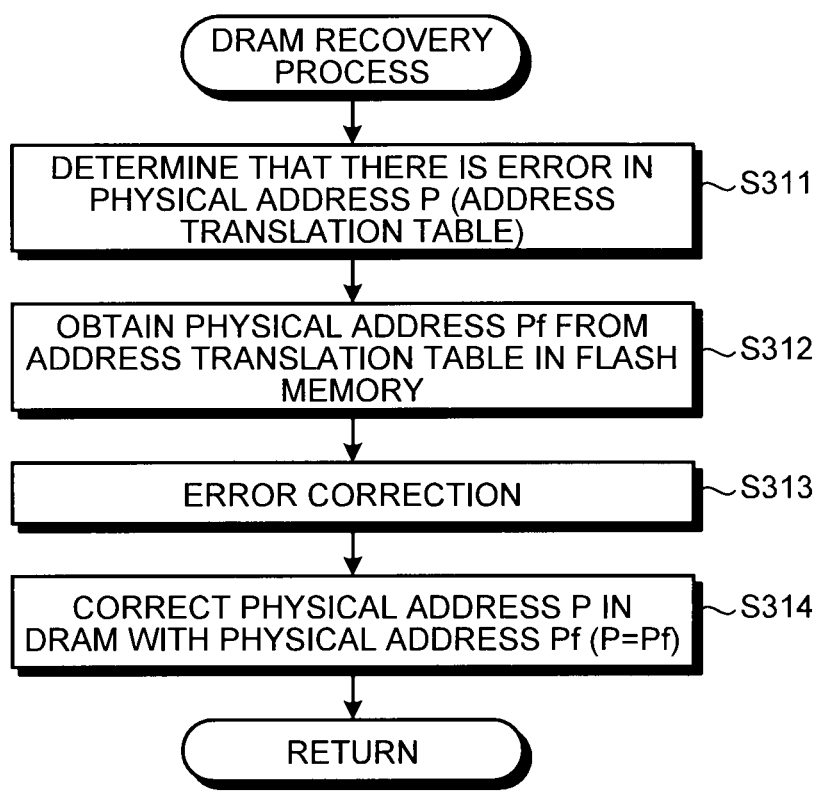
FIG. 14 is a flowchart illustrating a DRAM recovery process according to the third embodiment.

As illustrated in FIG. 14, in the DRAM recovery process according to the third embodiment, the translating unit 320 determines that there is an error in the physical address P read in step S113, that is, in the address translation table 131 in the DRAM 130 as a result of step S118 in FIG. 6 (step S311). The translating unit 320 then obtains a physical address Pf associated with the logical address Lr in the read request from the address translation table 361 stored in the flash memory 160 (step S312). In this process, the translating unit 320 also reads out an error correcting code A2 associated with the physical address Pf to be read.

Subsequently, the translating unit 320 inputs the read physical address Pf and error correcting code A2 to the correcting unit 180 to perform error correction (step S313). In step S313, the error correction is not performed on the physical address Pf if such error correction is not needed.

Next, the translating unit 320 corrects the physical address P in the address translation table 131 in the DRAM 130 with the physical address Pf subjected to error correction (step S314). As a result, the address translation table 131 in the DRAM 130 is corrected. The operation then returns to the read operation illustrated in FIG. 6.

In the third embodiment, as described above, a configuration to back up the address translation table 131 in the DRAM 130 to the flash memory 160 is provided in addition to the configuration similar to that of the first embodiment. As a result, it is possible to quickly correct an error occurring in the address translation table 231 itself. The other components and operations are similar to those in the first or second embodiment, and redundant description thereof will not be repeated here.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory device comprising:

a nonvolatile memory;

an interface unit configured to receive, from an outside, first address information that specifies a logical recording position of user data stored in the nonvolatile memory when the user data is to be read out;

an input/output control unit configured to control input and output of data to/from the nonvolatile memory;

an address translation table that associates the first address information with second address information indicating a physical recording position in the nonvolatile memory;

a translating unit configured to translate the first address information to the second address information according to the address translation table; and a check code generating unit configured to generate redundant data for checking whether or not there is any error in the user data and the first address information as one data piece, wherein the input/output control unit records the user data, the first address information and the redundant data as one data set in the physical recording position in the nonvolatile memory indicated by the second address information.

2. The device according to claim 1, further comprising a volatile memory configured to store therein the address translation table, wherein the address translation table includes first parity codes added to bit strings in a bit line direction in an array of bits in a form of a matrix constituted by a plurality of pieces of the second address information and second parity codes added to bit strings in a word line direction in the array of bits.

3. The device according to claim 2, further comprising a parity processing unit configured to correct the bit strings constituting the address translation table in the volatile memory by using the first parity codes or the second parity codes, wherein the translating unit copies part or the whole of the address translation table in the volatile memory into the nonvolatile memory, the parity processing unit checks the bit strings constituting the address translation table by using the first parity codes or the second parity codes when the translating unit copies part or the whole of the address translation table in the volatile memory into the nonvolatile memory, and the translating unit corrects the bit string in which an error is detected by the parity processing unit by using the first and second parity codes to recover the address translation table in the volatile memory.

4. The device according to claim 2, further comprising a parity processing unit configured to correct the bit strings constituting the address translation table in the volatile memory by using the first parity codes or the second parity codes, wherein when the interface unit receives reading of the user data recorded in the logical recording position specified by the first address information, the parity processing unit checks a bit string in the bit line direction containing the second address information associated with the first address information by using the first parity code added to the bit string, and the translating unit corrects the bit string in which an error is detected by the parity processing unit by using the first and second parity codes to recover the second address information in the volatile memory.

5. The device according to claim 3, wherein the translating unit inverts a bit value in the volatile memory for which errors are detected both in the first parity code and the second parity code thereof by the parity processing unit to recover the address translation table.

6. The device according to claim 4, wherein the translating unit inverts a bit value in the volatile memory for which errors are detected both in the first parity code and the second parity code thereof by the parity processing unit to recover the address translation table.

7. The device according to claim 1, further comprising a checking unit configured to check whether or not there is an error in the user data recorded in the nonvolatile memory and the first address information received by the interface unit by using the redundant data recorded in the nonvolatile memory when the interface unit receives reading of the user data recorded in the logical recording position specified by the first address information, wherein when the checking unit detects that there is no error in the user data recorded in the nonvolatile memory and the first address information received by the interface unit, the input/output control unit outputs the user data through the interface unit.

8. The device according to claim 7, wherein when the checking unit detects that there is an error in the user data recorded in the nonvolatile memory and the first address information received by the interface unit, the checking unit checks again whether or not there is any error in the user data recorded in the nonvolatile memory and the first address information, and determines that there is an error in the address translation table when it is determined that there is an error in the user data recorded in the nonvolatile memory and the first address information.

9. The device according to claim 8, further comprising a volatile memory in which the address translation table is stored, wherein the translating unit copies the address translation table stored in the volatile memory into the nonvolatile memory, and when there is an error in the address translation table in the volatile memory, the translating unit recovers the address translation table in the volatile memory by using the address translation table in the nonvolatile memory.

10. A controlling method executed by a semiconductor memory device comprising a nonvolatile memory, comprising;

receiving, from an outside, first address information that specifies a logical recording position of user data stored in the nonvolatile memory when the user data is to be read out;

controlling input and output of data to/from the nonvolatile memory;

translating the first address information to second address information according to a address translation table, the second address information indicating a physical recording position in the nonvolatile memory, the address translation table associating the first address information with the second address information;

generating redundant data for checking whether or not there is any error in the user data and the first address information as one data piece; and recording the user data, the first address information and the redundant data as one data set in the physical recording position in the nonvolatile memory indicated by the second address information.

* * * * *